Feb. 18, 1964   F. G. YADRO ETAL   3,121,236
CHEMICALS FEED DEVICE FOR FLUSH TANK
Filed Dec. 17, 1959
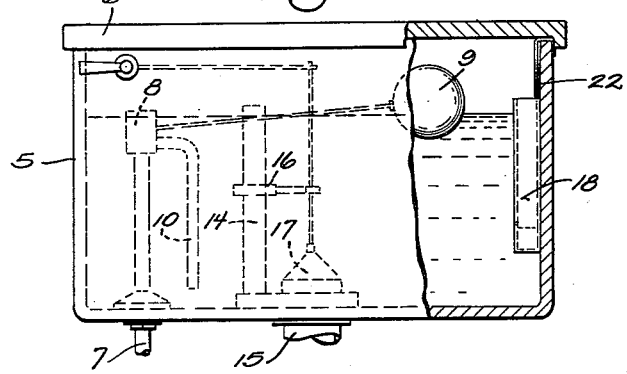
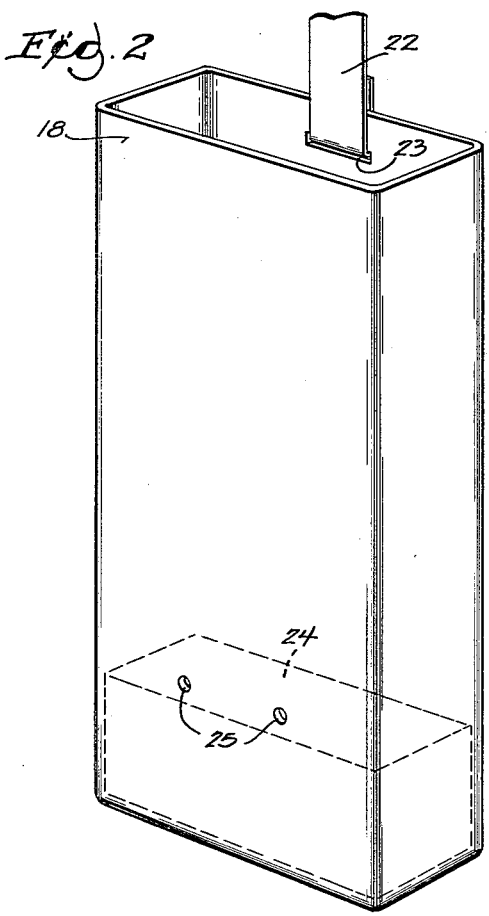
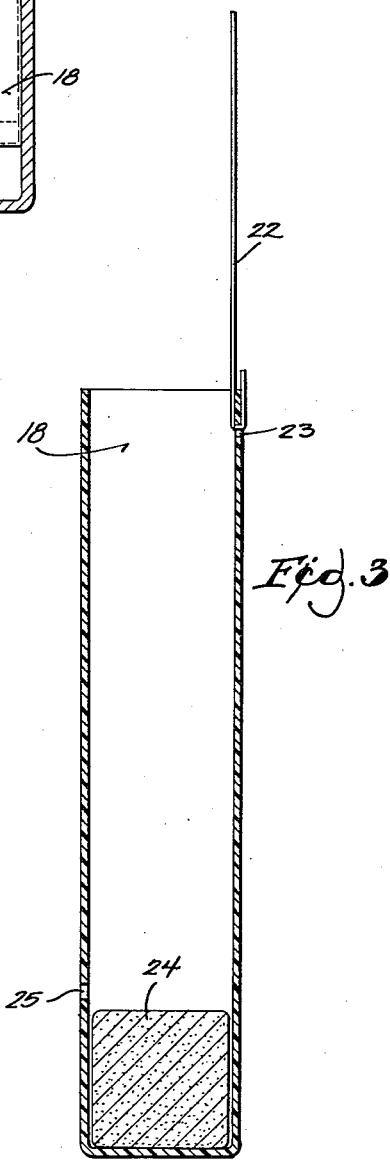
INVENTORS
FRANK G. YADRO
LEROY H. KERR
BY
ATTORNEY 3,121,236
CHEMICALS FEED DEVICE FOR FLUSH TANK
Frank G. Yadro, Rte. 2, Box 104A, Mukwonago, Wis., and Le Roy H. Kerr, 1408 S. 38th St., Milwaukee, Wis.
Filed Dec. 17, 1959, Ser. No. 860,149
2 Claims. (Cl. 4—228)

This invention relates to improvements in a metering dispenser for automatically supplying a chemical composition in given quantity to sanitary plumbing for keeping the plumbing free from coatings and scale, and particularly coatings and scale due to high iron content and hardness of water.

Many areas have water called "hard" due to its content of calcium and magnesium salts and some such waters also have a high iron content. When such water is used to flush toilet bowls and the like, it is not economical to remove the constituents causing hardness or the iron content and the tanks and bowls soon acquire coatings and scale of a yellowish-brownish color which adhere strongly to the tanks and bowls and are so hard as to be difficult to remove without damage to the tank or bowl. In some instances iron content is so high that it acts electrolytically upon and causes failure of the copper and brass mechanism in toilet tanks and in other cases the calcium and magnesium salts deposit alone or in mixture with iron salts and other dirt form unsightly coatings. Records show that tank mechanisms must be replaced as often as approximately once per year in some areas.

When toilet bowls are of the type having a manifold or flow distributing channel in the upper edge of the bowl with many small openings discharging water into the bowl, such openings become progressively more clogged with calcium and magnesium salts deposits. In relatively short times the smaller discharge openings are so restricted that a single tankful of water no longer completely flushes the bowl. As the calcium and magnesium deposits build up, more and more tankfuls of water are required to fully flush the bowl until otherwise satisfactory bowls have had to be replaced because heretofore there has been no satisfactory way of cleaning such deposits out of the discharge openings. Records show the need for replacement of otherwise good toilet bowls in a particular hard water area, greatly in excess of such needs in areas where the water does not contain a high concentration of calcium and magnesium salts.

Many chemical compounds are known which reduce the action of high iron content and which could reduce or entirely eliminate precipitation of iron, calcium and magnesium compounds in toilet tanks or bowls. To be effective such compounds must be metered into each tankful of water in an amount sufficient to stop further build-up of deposits and to remove gradually the deposits already formed. The amount required depends on the iron content and hardness of the water. The chemical composition should be furnished in a form which will make it impossible to overload the dispenser or to waste chemicals particularly while the dispenser is being loaded. But an adequate amount of various chemicals must be fed in proper proportion and metering dispensers should deliver the same amount of the chemicals to each tank of water until a given loading of the chemical has been entirely consumed.

In the drawings:

FIG. 1 is an elevational view of a water tank for a toilet with the usual water control mechanism indicated in dotted line and with a portion of the tank wall broken away to show our dispenser in position in the tank;

FIG. 2 is a perspective of our dispenser with a fresh supply of chemical therein; and FIG. 3 is a longitudinal cross-section of FIG. 2.

Referring specifically to the drawings, 5 designates a usual water tank for toilets and the like, which is closed by cover 6. Water is supplied to the tank by pipe 7 under control of the valve 8 actuated responsive to the position of a float 9 and is discharged into the tank by way of pipe 10. An overflow pipe 14 is connected with a pipe 15 by which water is discharged from the tank and extends upward in the tank to limit the level to be reached by the water in the tank. The overflow pipe supports a bracket 16 guiding the stem of a valve 17 which controls the discharge of water from the tank through the pipe 15. The mechanism operating the discharge valve 17 is well known and is not shown as is also the case with other portions of the mechanism usual in tanks for toilet bowls and the like. A metering dispenser 18 for chemicals is suspended in the tank in such position as to be clear of the mechanism and preferably in a location where it is subjected to only a minimum of the turbulence of water entering the tank by way of the pipe 10.

The dispenser 18 is in the form of a simple elongated box with one open end and is preferably made of transparent non-corrodible material such as one of the known synthetic resins. The dispenser is hung from the upper edge of the tank 5 by a strap 22 of non-corrodible metal and which is preferably light enough so that it may be bent after passing through slot 23 and bent over the tank edge to form hooks at its ends. The strap 22 should be so light that its length between the hooks can be readily adjusted to bring the open end of the dispenser as nearly as practical to the water level in the tank determined by the end of the overflow pipe. The strap should not interfere with placement of a block 24 of chemicals in the dispenser. The strap is not subject to other limitations and any other suspending means may be used which will meet the above conditions.

The dispenser is formed as a box 18, and is made of a length so that placement with its open end at the water level of the tank so positions dispensing holes, that a predetermined quantity of chemical solution is invariably completely discharged each time a tankful of the water is used. As the quantity of a solution of given chemicals required by tankful of water depends on the hardness and iron content of the water, it will be obvious that the other dimensions of the dispenser 18 must be varied to provide the cubic capacity necessary to hold a sufficient quantity of solution in the concentration produced with little movement of water in the dispenser between flushings of the tank. Placing of the dispenser 18 in the zone of minimum turbulence in the tank while it is refilling, the length of the box portion from which the chemical solution is discharged and the other dimensions of the dispenser are all related and must be taken into account in providing an effective but the most economical dispenser for a given water. It has been found that 20–45 p.p.m. of active chemicals are required dependent on the quality of the water, with average requirement being of the order of 30 p.p.m. for the larger hard water areas in U.S.A.

A number of holes 25 are formed in a wall of the dispenser 18 for free discharge of the water solution of the chemical block 24 into the tank whenever the water is below the level of the holes. The number and sizes of the holes is critical to accurate metering of the chemical solution into the tank and to use of the dispenser without clogging of the holes, two holes being shown to secure discharge over the entire cross-sectional area without such turbulence and velocity as cause water scouring of the chemical block. The holes are a size to avoid circulating currents of the water in the dispenser provided the dispenser is not suspended with its open end below the level of the water in a full tank, while securing full discharge of solution above the holes within the time the tank water level is below the holes. Therefore we suspend the dispenser with open end above the water level to allow for changes in the level due to changes in water pressure. The actual diameter of th holes 25 shown is of the order of 3/16″ but such diameter is determined by the number of holes required for a given size and shape of the dispenser, the amount of chemical solution to be discharged into a given tank of water and the rate of discharge of the tank. Holes 25 are equally spaced from the side edges of the dispenser and are 1/4″ above the upper surface of a new block of chemical in the dispenser. The size of holes is that found necessary in the Milwaukee, Wisconsin area where water hardness and iron content are relatively high. All the solution in a container down to the level of the holes must be discharged between the time the level of water in the tank drops below the level of the holes and the time the water level again rises up to the holes, which is 20–25 seconds for the make of toilet for which dispenser dimensions are given herein.

The amount of chemical to be put into solution is predetermined from the size of the tank 5 and the iron content and hardness of the water. The pH of the solution in the dispenser for the combination of chemicals mentioned below, is approximately 10 and it is desired that the pH of each tankful of water be 7.0–7.5 after its discharge into the bowl. To achieve such pH in the tank, the pH of the water used must be considered together with the dimensions of the dispenser. For example, we have found that toilet tanks averaging 5½″ x 14½″ x 18″ in internal dimensions and with mechanism of the usual size, require a dispenser having internal dimensions above the holes of ½″ x 3½″ x 4⅞″ when the pH of the supply water is in the neighborhood of 6.8 and the water has the hardness found in the Milwaukee area. For such tanks discharging and refilling to the level of the dispenser holes in 20–25 seconds, we find that the dispenser is properly emptied with two holes of 3/16″ diameter and that the holes do not clog up. Due to permissible variation in pH values of the treated water, some variation is permissible in calculation of the dimensions of the dispenser and the number and sizes of the holes. Experiment and experience have shown that the above proportions are adequate to prevent coating and scaling of tanks and toilet bowls and to cause gradual removal of prior coatings and scales when tanks of the above example are used either in homes or in business places with the above water.

As the width and thickness of the dispenser above the holes 25 are determined by the above-mentioned factors, only the depth of the dispenser below the holes can be varied to provide space for the chemical block 24. The depth of the dispenser 18 below the level of holes 25 should be such as to accommodate size of chemical block sufficient for at least one week dependent upon the water being used. In the example above given, we have found that a depth below the holes of 1¼″ is adequate for at least two weeks for toilets used by no more than twenty persons as permitted by local regulations.

Although the chemical composition may vary, we have found a mixture of sequestering agent effective for calcium, iron and magnesium, water-softeners such as the sodium polyphosphates, an alkalizer such as soda ash or a sodium silicate, and a wetting agent to be satisfactory. We press the mixture into a block of a size slightly less than the width and thickness of the dispenser so that one block provides proper loading and serves for a reasonable length of time. We make no claim for the chemical composition itself and therefore make no further disclosure thereof.

In use, the chemical block 24 quickly loses its block shape and forms a crystalline mass extending over the entire cross-sectional area of the dispenser so that only the upper surface of the chemical combination is exposed to solution by the water. When a tankful of water is discharged, the level of the solution in the dispenser drops at a lower rate than the level of the water in the tank. Approximately one-half of the solution remains in the dispenser at the moment the tank is emptied and the balance of the solution discharges into water re-filling the tank. Thus, the concentration of solution in the water while it is standing in the tank is only one-half that of the water as it is discharged into the bowl. The tank being covered, there is no evaporation from the water in the tank while the water standing in the bowl is constantly being evaporated so that the concentration of the scale-producing salts in the water in the bowl is being constantly increased. As the water level in the tank rises above the level of the holes 25, the water flows quietly into the dispenser through the holes and, assuming that the dispenser has been properly placed, reaches the upper edge of the dispenser at approximately the time the tank is filled. Hence, the flow of the solution into and out of the dispenser is not subject to substantial turbulence and the rate of the solution of the chemical remains substantially constant until all of a block has been used.

It will be seen that the proportions of the dispenser are determined by the depth required to place the discharge holes approximately midway between the tank bottom and the maximum level of the water therein when the open end of the dispenser is at the level of water, and the amount of solution required to raise the pH of the water in the bowl to 7.0–7.5. Hence, two dimensions of the dispenser are dependent on the above factors. The number and spacing of the discharge holes is such as to avoid carrying any of the chemicals in solid form into the tank and the sizes of the holes is such as to provide for discharge of approximately one-half of the chemicals solution when the tank is emptying and the balance when the tank is re-filling. Hence, the factors of number of holes, hole spacing and hole size are related in themselves and are related to the dimensions of the dispenser. In addition to placement of the dispenser with its open end substantially at the maximum level of water in the tank, it is placed where it will be subjected to only the minimum of turbulence of water entering the tank and so that the holes can discharge freely without interference from the tank wall or tank mechanism.

We claim:

1. A dispenser for metering, alkalizing and water-softening chemicals solution into a toilet water tank and comprising an open-ended box, and means for suspending the box in the tank within the water therein, the box being located to bring the open end thereof at the level of water in the filled tank, the box being of a depth to place holes in a sidewall thereof at approximately midway between the bottom of and the maximum level of the water in the tank, the holes being approximately ⅛″ diameter, for discharging approximately one-half of the chemicals solution into the tank while it is emptying and discharging the balance of the solution into the tank while it is re-filling, the other dimensions of the box being so related to the depth thereof as to provide space for a sufficient quantity of the chemicals solution to raise the pH of the water discharged into the bowl to 7.0–7.5 upon each emptying of the tank, the number of holes being adapted to discharge the chemicals solution at velocities below those causing scouring of the mass of chemicals.

2. A dispenser for metering, alkalizing and water-softening chemicals solution into a toilet water tank having vaiving mechanism therein and comprising an open-ended box, and means for suspending the box in the tank within the water therein, the box being located in the zone of minimum turbulence when the tank is being filled and is being emptied and to bring the open end thereof at the level of the water in the filled tank, the box having holes across the wall and at a distance from the box bottom and providing a chamber for receiving a mass of solid chemicals below said holes, the box being placed in the tank for discharge of the chemicals solution from the holes without interference by portions of the tank and the mechanism therein, the holes being approximately 1/8" diameter and being placed approximately midway of the bottom of the box and level of water therein for discharging approximately one-half of the chemicals solution into the tank while it is emptying and discharging the balance of the solution into the tank while it is re-filling, the other dimensions of the box being so related to the depth thereof as to provide space for a sufficient quantity of the chemicals solution to raise the pH of the water discharged into the bowl to 7.0–7.5 upon each emptying of the tank for a given number of tankfuls of water used, the holes being adjacent the upper surface of the mass of solid chemicals and being of a size to avoid circulation of water and solution into and out of the box when the tank is full.

References Cited in the file of this patent

UNITED STATES PATENTS 1,803,860    Marks ----------------- May 5, 1931

FOREIGN PATENTS 281,853    Great Britain ----------- Dec. 15, 1927